United States Patent
Heo et al.

(10) Patent No.: US 8,102,271 B2
(45) Date of Patent: Jan. 24, 2012

(54) APPARATUS AND METHOD FOR ASSET TRACKING BASED ON UBIQUITOUS SENSOR NETWORK USING MOTION SENSING

(75) Inventors: Tae-Wook Heo, Daejeon (KR); Seung-ki Hong, Daejeon (KR); Woo-Sug Jung, Daejeon (KR); Sun-Joong Kim, Daejeon (KR); Jong-Arm Jun, Daejeon (KR); Cheol Sig Pyo, Daejeon (KR); Young-Min Ji, Seoul (KR); Byung-Yong Sung, Seoul (KR)

(73) Assignees: Electronics and Telecommunications Research Institute, Daejeon (KR); Motorola, Inc., Schaumburg, IL (US)

( * ) Notice: Subject to any disclaimer, the term of this patent is extended or adjusted under 35 U.S.C. 154(b) by 377 days.

(21) Appl. No.: 12/368,568

(22) Filed: Feb. 10, 2009

(65) Prior Publication Data
US 2010/0201535 A1 Aug. 12, 2010

(51) Int. Cl.
*G08B 21/00* (2006.01)
*G08B 13/14* (2006.01)
*G08B 1/08* (2006.01)
(52) U.S. Cl. ............ 340/686.1; 340/539.13; 340/572.1; 340/5.91; 340/8.1

(58) Field of Classification Search ............... 340/686.6, 340/572.1
See application file for complete search history.

(56) References Cited

U.S. PATENT DOCUMENTS

| | | | |
|---|---|---|---|
| 6,859,831 B1* | 2/2005 | Gelvin et al. | 709/224 |
| 6,919,803 B2* | 7/2005 | Breed | 340/539.14 |
| 7,245,215 B2 | 7/2007 | Göllü et al. | |
| 7,321,305 B2* | 1/2008 | Gollu | 340/572.1 |
| 2004/0080412 A1* | 4/2004 | Smith et al. | 340/539.13 |
| 2006/0128349 A1 | 6/2006 | Yoon | |
| 2007/0057779 A1* | 3/2007 | Battista et al. | 340/425.5 |

FOREIGN PATENT DOCUMENTS

| | | |
|---|---|---|
| KR | 1020060058581 A | 5/2006 |
| KR | 10-0719280 B1 | 5/2007 |
| KR | 1020070057645 A | 6/2007 |

\* cited by examiner

*Primary Examiner* — Donnie Crosland
(74) *Attorney, Agent, or Firm* — Ladas & Parry LLP

(57) ABSTRACT

Provided are an apparatus and method for asset tracking based on a ubiquitous sensor network (USN) using a motion sensing. The apparatus may include: a motion sensing manager to receive motion sensing information from a sensor; a filtering processor to filter the motion sensing information based on a filtering parameter and to determine whether a motion occurs based on the filtered motion sensing information; and a location information update (LU) manager to perform LU depending on whether the motion occurs.

15 Claims, 13 Drawing Sheets

|  | 1401 | 1403 |  |
|---|---|---|---|
|  | Sensor Condition 1 Level 1 | Sensor Condition 2 Level 2 |  |
| Level 0 Default Periodic LU | Level 1 Fast Periodic LU | Level 2 Slow Periodic LU | Level 0 Default Periodic LU |

FIG. 15

|  | 1501 | 1503 |  |
|---|---|---|---|
|  | Sensor Condition 1 Level 1 | Sensor Condition 2 Level 2 |  |
| Level 0 Default Motion Sensor Filtering Parameter | Level 1 Motion Sensor Filtering Parameter Low Threshold & Small Time Interval | Level 2 Motion Sensor Filtering Parameter High Threshold & Big Time Interval | Level 0 Default Motion Sensor Filtering Parameter |

APPARATUS AND METHOD FOR ASSET TRACKING BASED ON UBIQUITOUS SENSOR NETWORK USING MOTION SENSING

BACKGROUND

1. Field of the Invention

The present invention relates to an apparatus and method for asset tracking based on a ubiquitous sensor network (USN) using a motion sensing, and more particularly, to an apparatus and method for asset tracking based on a USN using a motion sensing that may accurately track a location of an asset using the motion sensing.

This work was supported by the IT R&D program of MIC/ IITA. [2006-S-601-02, Development of u-City Application Sensor Network System]

2. Description of the Related Art

Currently, researches regarding an apparatus for asset tracking in an asset tracking system are being made.

Generally, in order to provide an asset tracking service in the asset tracking system, a message may be exchanged between a sensor node corresponding to an asset node and another sensor node corresponding to a reference node. A location of the asset node may be tracked using a received signal strength of the message.

However, no technology capable of optimizing a battery lifetime of the asset node and providing accurate location information of the asset node is disclosed.

Accordingly, there is a need for a technology that may enhance a battery lifetime of an asset node and provide more accurate location information of the asset node.

SUMMARY

An aspect of the present invention provides an apparatus and method for asset tracking based on a ubiquitous sensor network (USN) using a motion sensing that may optimize a battery lifetime of an asset node and may also provide more accurate location information of the asset node.

Another aspect of the present invention also provides an apparatus and method for asset tracking based on a USN using a motion sensing that may provide more accurate location information of an asset node using various types of display devices.

Another aspect of the present invention also provides an apparatus and method for asset tracking based on a USN using a motion sensing that may control a location information update (LU) of an asset node based on accuracy of location information, a battery lifetime, a zone area where the asset node belongs, a sensor condition sensed by the sensor node, and the like.

According to an aspect of the present invention, there is provided an apparatus for asset tracking based on a USN using a motion sensing, the apparatus including: a motion sensing manager to receive motion sensing information from a sensor; a filtering processor to filter the motion sensing information based on a filtering parameter and to determine whether a motion occurs based on the filtered motion sensing information; and a LU manager to perform LU depending on whether the motion occurs.

According to another aspect of the present invention, there is provided an apparatus for asset tracking based on a USN using a motion sensing, the apparatus including: a LU request receiver to receive a LU request from an asset node that performs a LU based on the motion sensing; and an asset location information manager to update location information of the asset node based on the LU request and to mange the location information of the asset node.

According to still another aspect of the present invention, there is provided a method for asset tracking based on a USN using a motion sensing, the method including: determining whether motion sensing information is received; determining whether a LU of an asset node is required based on the motion sensing information and a filtering parameter, when the motion sensing information is received; and performing the LU of the asset node when it is determined the LU of the asset node is required.

According to yet another aspect of the present invention, there is provided a method for asset tracking based on a USN using a motion sensing, the method including: receiving a LU request from an asset node that performs a LU based on the motion sensing; and updating location information of the asset node based on the LU request to manage the location information of the asset node.

Additional aspects, features, and/or advantages of the invention will be set forth in part in the description which follows and, in part, will be apparent from the description, or may be learned by practice of the invention.

EFFECT OF THE INVENTION

According to embodiments of the present invention, it is possible to optimize a battery lifetime of an asset node and to provide more accurate location information of the asset node.

Also, according to embodiments of the present invention, it is possible to minimize a location information update (LU) of an asset node and to a periodically perform the LU of the asset node.

Also, according to embodiments of the present invention, it is possible to control a LU of an asset node based on accuracy of location information, a battery lifetime, a zone area where the asset node belongs, a sensor condition sensed by the sensor node, and the like.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIGS. 10 through 15 illustrate examples of location information update (LU) and motion sensor filtering under various conditions according to an embodiment of the present invention;

DETAILED DESCRIPTION

Figure 1:
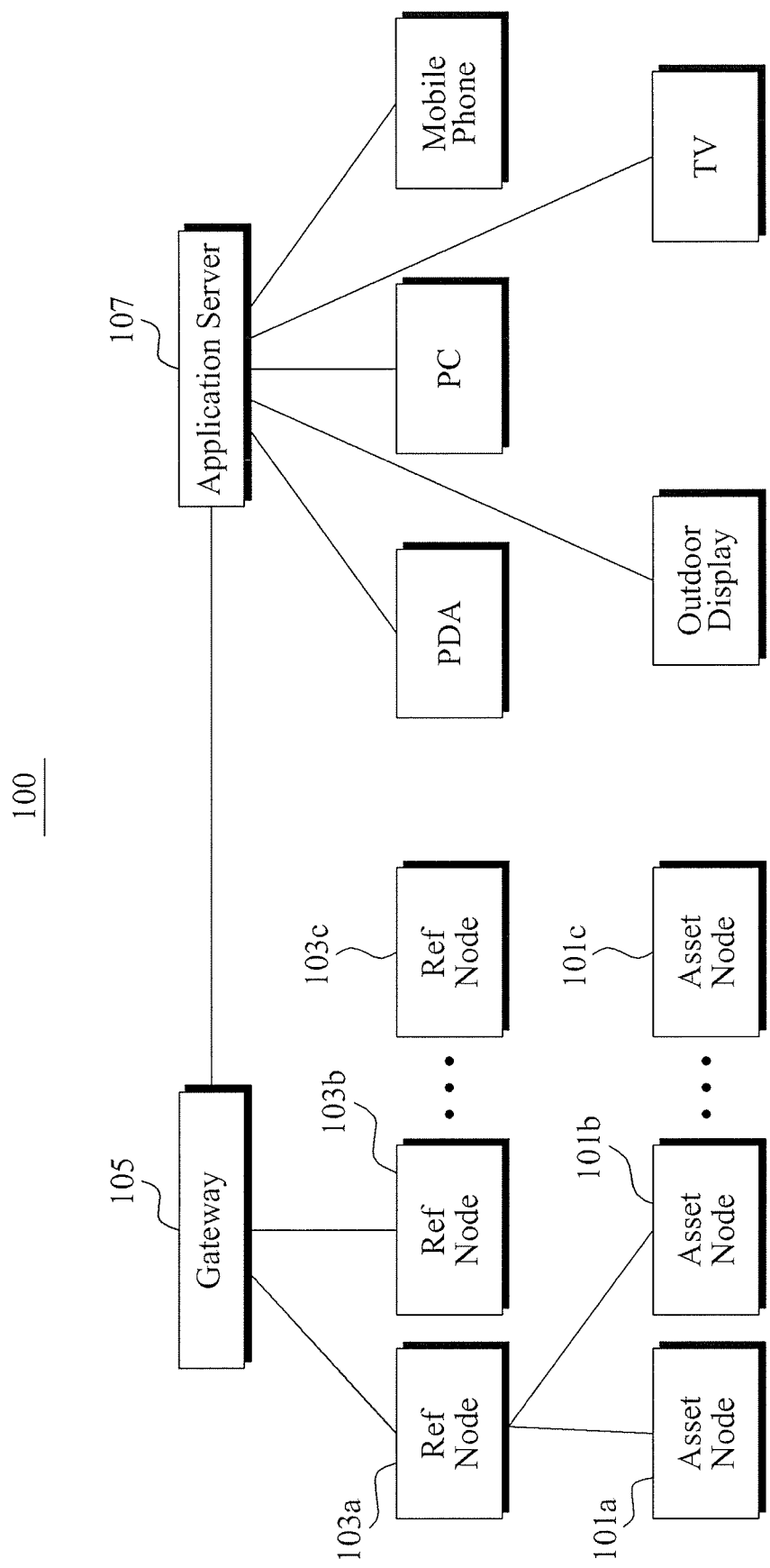
FIG. 1 is a block diagram illustrating the entire architecture of an asset tracking system according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined detailed description related to a related known function or configuration they may make the purpose of the present invention unnecessarily ambiguous in describing the present invention, the detailed description will be omitted here.

FIG. 1 is a block diagram illustrating the entire architecture of an asset tracking system 100 according to an embodiment of the present invention.

Referring to FIG. 1, the asset tracking system 100 may include a plurality of asset nodes 101a, 101b, . . . , 101c, a plurality of reference nodes 103a, 103b, . . . , 103c, a gateway 105, and an application server 107. In the following description, any one of the asset nodes 101a, 101b, . . . , 101c may be represented by an asset node 101. Also, any one of the reference nodes 103a, 103b, . . . , 103c may be represented by a reference node 103.

The asset node 101 may collect changing location information of assets, and provide the collected location information to an upper node. Here, the upper node may be the reference node 103 or the gateway 105. Also, the location information may include, for example, a received signal strength indication (RSSI) value at a link that is set with neighboring nodes.

The reference node 103 may functions to transmit a radio frequency (RF) signal to the asset node 101 at a fixed location, and to bridge the asset node 101 and the gateway 105.

The gateway 105 may function to manage a personal area network (PAN) and to interoperate a single PAN with an outside network, for example, an Internet Protocol (IP) network.

In this instance, the gateway 105 may include a coordinator to control the PAN.

Accordingly, the PAN may include a single coordinator, reference nodes, and asset nodes.

Generally, the gateway 105 may function to communicate with the application server 107. The application server 107 may function to process, manage, and analyze information collected by the single PAN.

Also, the application server 107 may display location information of an asset via various types of display devices, for example, a personal digital assistant (PDA), a personal computer (PC), a mobile phone, an outdoor display, a television (TV), and the like.

In the following description, an asset tracking apparatus may denote a device that includes a single node, such as an asset node, a gateway, an application server, and the like, constituting an asset tracking system.

Figure 2:
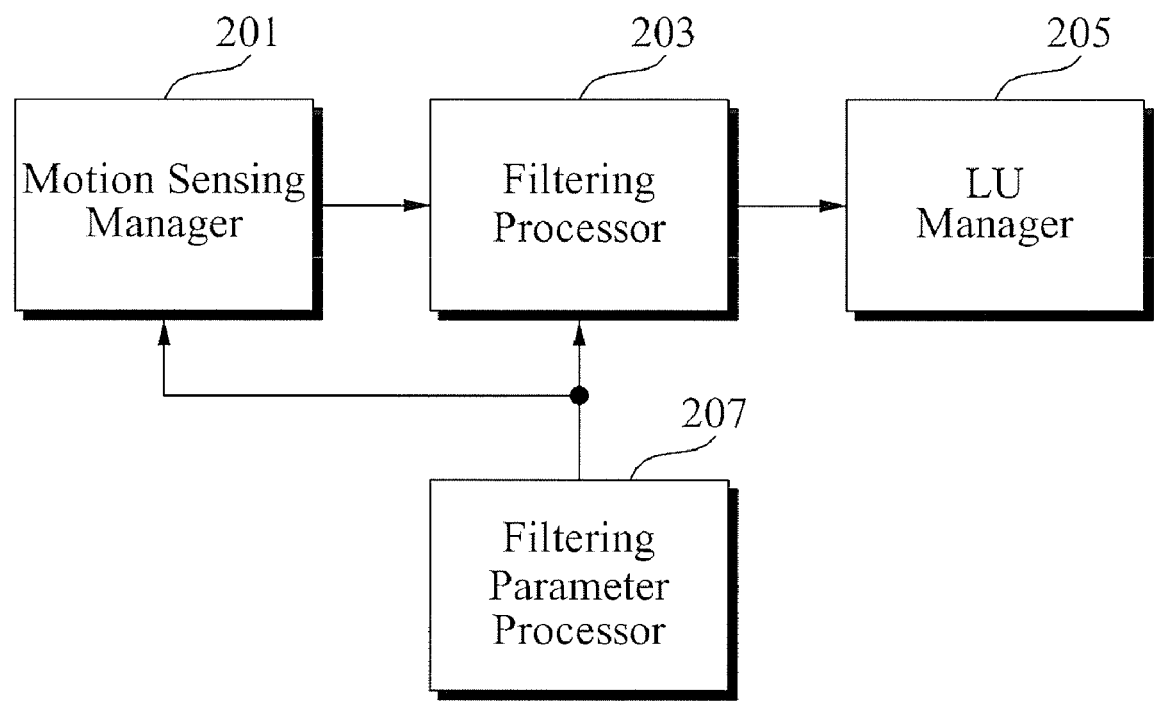
FIG. 2 is a block diagram illustrating a configuration of an asset tracking apparatus according to an embodiment of the present invention.

FIG. 2 is a block diagram illustrating a configuration of an asset tracking apparatus 200 according to an embodiment of the present invention.

The asset tracking apparatus 200 of FIG. 2 may be applicable to the asset node 101 of FIG. 1.

Referring to FIG. 2, the asset tracking apparatus 200 may include a motion sensing manager 201, a filtering processor 203, and a location information update (LU) manager 205. Also, the asset tracking apparatus 200 may further include a filtering parameter processor 207.

The motion sensing manager 201 may receive sensing information from various types of sensors. In particular, the motion sensing manager 201 may receive motion sensing information from a sensor such as a motion sensor and an accelerator sensor.

The filtering processor 203 may filter the motion sensing information based on a filtering parameter, and determine whether a motion occurs, based on the filtered motion sensing information.

The filtering parameter may be determined according to a type of an asset. For example, the filtering parameter may be a motion filtering time, a time interval to check the motion sensing information, a threshold value, and the like.

The LU manager 205 may perform the LU depending on whether the motion occurs. In this instance, the LU manager 205 may request an upper node, that is, a gateway or an application server, to perform the LU of the asset by collecting the location information and by transmitting the collected location information to the upper node.

In this instance, when the filtered motion sensing information is less than a reference value, the LU manager 205 may not perform the LU. Conversely, when the filtered motion sensing information is greater than or equal to the reference value, the LU manager 205 may perform the LU. Here, the reference value may be the threshold value among the filtering parameters.

Specifically, only when the motion sensing information is not noise but a real motion, the asset tracking apparatus 200 may update the location information of the asset. Through this, it is possible to prolong a battery lifetime to, for example, more than six months.

Also, when the motion sensing information is received, the LU manager 205 may set a polling interval for exchange of a polling message to be short, and may perform the LU depending on whether the motion occurs.

The filtering parameter processor 207 may generate the filtering parameter according to a predetermined scheme, and provide the generated filtering parameter to the filtering processor 203.

In this instance, the filtering parameter processor 207 may generate the filtering parameter based on at least one of accuracy of location information for the asset, the battery lifetime, a zone area where the asset tracking apparatus 200 belongs, and a sensor condition sensed by the asset tracking apparatus 200. Also, generating of the filtering parameter may include concepts of setting and changing the filtering parameter.

Figure 3:
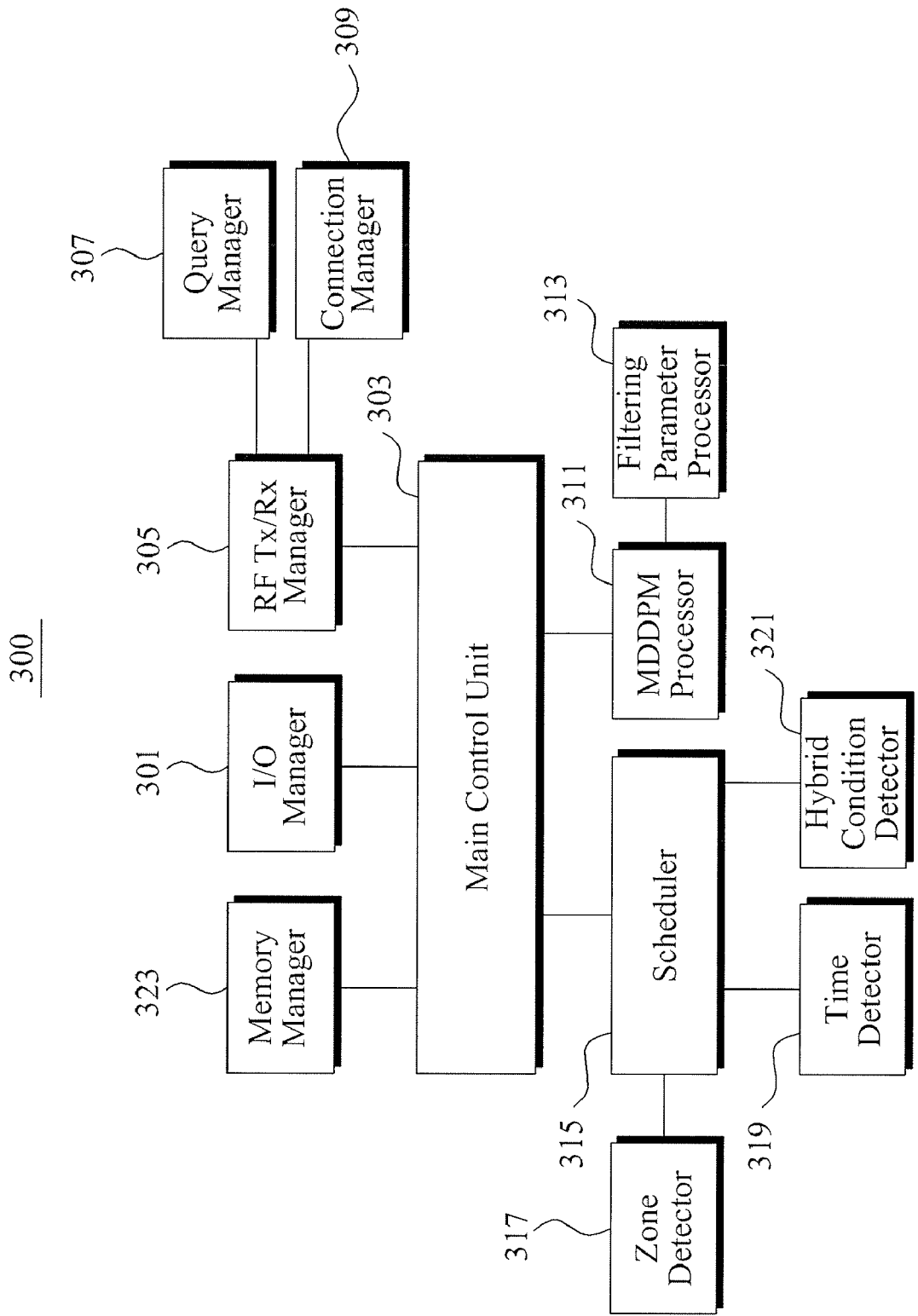
FIG. 3 is a block diagram illustrating a configuration of an asset tracking apparatus according to another embodiment of the present invention.

FIG. 3 is a block diagram illustrating a configuration of an asset tracking apparatus 300 according to another embodiment of the present invention.

The asset tracking apparatus 300 of FIG. 3 may be applicable to the asset node 101 of FIG. 1.

Referring to FIG. 3, the asset tracking apparatus 300 may include an input/output (I/O) manager 301, a main control unit 303, a radio frequency transmitter/receiver (RF Tx/Rx) manager 305, a query manager 307, a connection manager 309, a motion driven dynamic power management (MD-DPM) processor 311, a filtering parameter processor 313, a scheduler 315, a zone detector 317, a time detector 319, a hybrid condition detector 321, and a memory manager 323.

The I/O manager 301 may control all the input/output devices that are included in the asset tracking apparatus 300, for example, sensor interfaces such as a temperature, a humidity, a motion, and the like.

The main control unit 301 may process all the information in the asset tracking apparatus 300 and control the entire operation of the asset tracking apparatus 300.

The RF Tx/Rx manager 305 may manage a communication of the asset tracking apparatus 300.

The query manager 307 may process various types of queries occurring in a PAN.

For example, the various types of queries may include simple queries such as "what is the current temperature?", "what is the current humidity", and the like, and complex queries such as "what is the temperature measured every half an hour?", "please measure the temperature every one hour and let me know when it is more than 30 degrees", and the like.

The connection manager 309 may manage a connection to and a disconnection from the PAN.

The MDDPM processor 311 may measure location information based on a query and a period, and perform a process for transmitting the measured location information to an upper node.

The filtering parameter processor 313 may generate a filtering parameter according to a predetermined scheme, and provide the generated filtering parameter for the MDDPM processor 311.

The scheduler 315 may perform a message processing and a timer control while main routines are being performed. In particular, the scheduler 315 may perform the message processing and the timer control according to information that is detected by the zone detector 317, the time detector 319, and the hybrid condition detector 321.

The zone detector 317 may detect a zone area where the asset tracking apparatus 300 belongs, or may determine whether the asset tracking apparatus 300 exists in a targeted zone area.

The time detector 319 may determine whether a current time is detected, or whether a predetermined period of time is elapsed.

The hybrid condition detector 321 may detect an environment where the asset tracking apparatus 300 belongs, or various types of conditions. Examples of the environment or the various types of conditions will be described later.

The asset tracking apparatus 300 may perform a more suitable function for a given condition, based on the information that is detected by the zone detector 317, the time detector 319, and the hybrid condition detector 321.

The memory manager 323 may manage a memory area of the asset tracking apparatus 300 according to a control of the main control unit 303.

Figure 4:
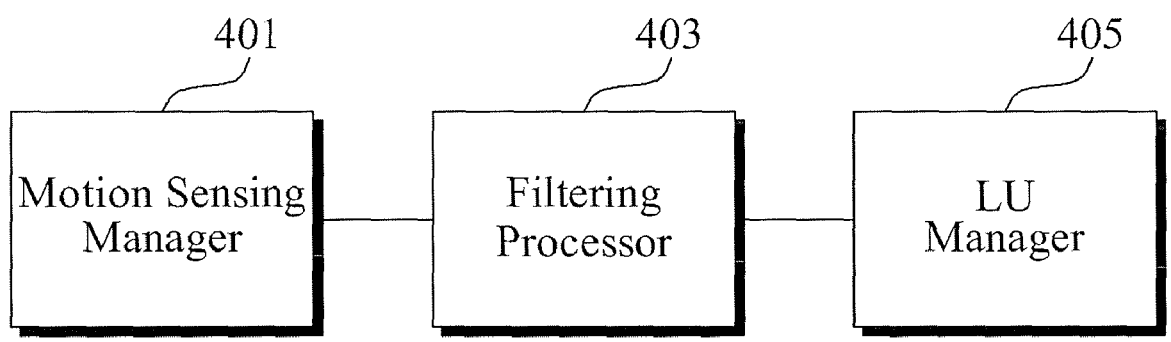
FIG. 4 is a block diagram illustrating a configuration of a motion driven dynamic power management (MDDPM) processor according to an embodiment of the present invention.

FIG. 4 is a block diagram illustrating a configuration of an MDDPM processor 400 according to an embodiment of the present invention.

The MDDPM processor 400 of FIG. 4 may be applicable to the MDDPM processor 311 of FIG. 3.

Referring to FIG. 4, the MDDPM processor 400 may include a motion sensing manager 401, a filtering processor 403, and a LU manager 405.

The motion sensing manager 401 may transfer inputs of various sensors to the filtering processor 403. In particular, the motion sensing manager 401 may receive motion sensing information from a motion sensor and transfer the received motion sensing information to the filtering processor 403.

In this instance, the motion sensing manager 401 may include a sensor and an analog-to-digital (A/D) converter, and may have a structure that is connected to an interrupt. Also, the motion sensing manager 401 may have parameter information in an Extensible Markup Language (XML) format, for example, sensor information associated with a minimum value and a maximum value of each of the sensors, and the like.

Figure 7:
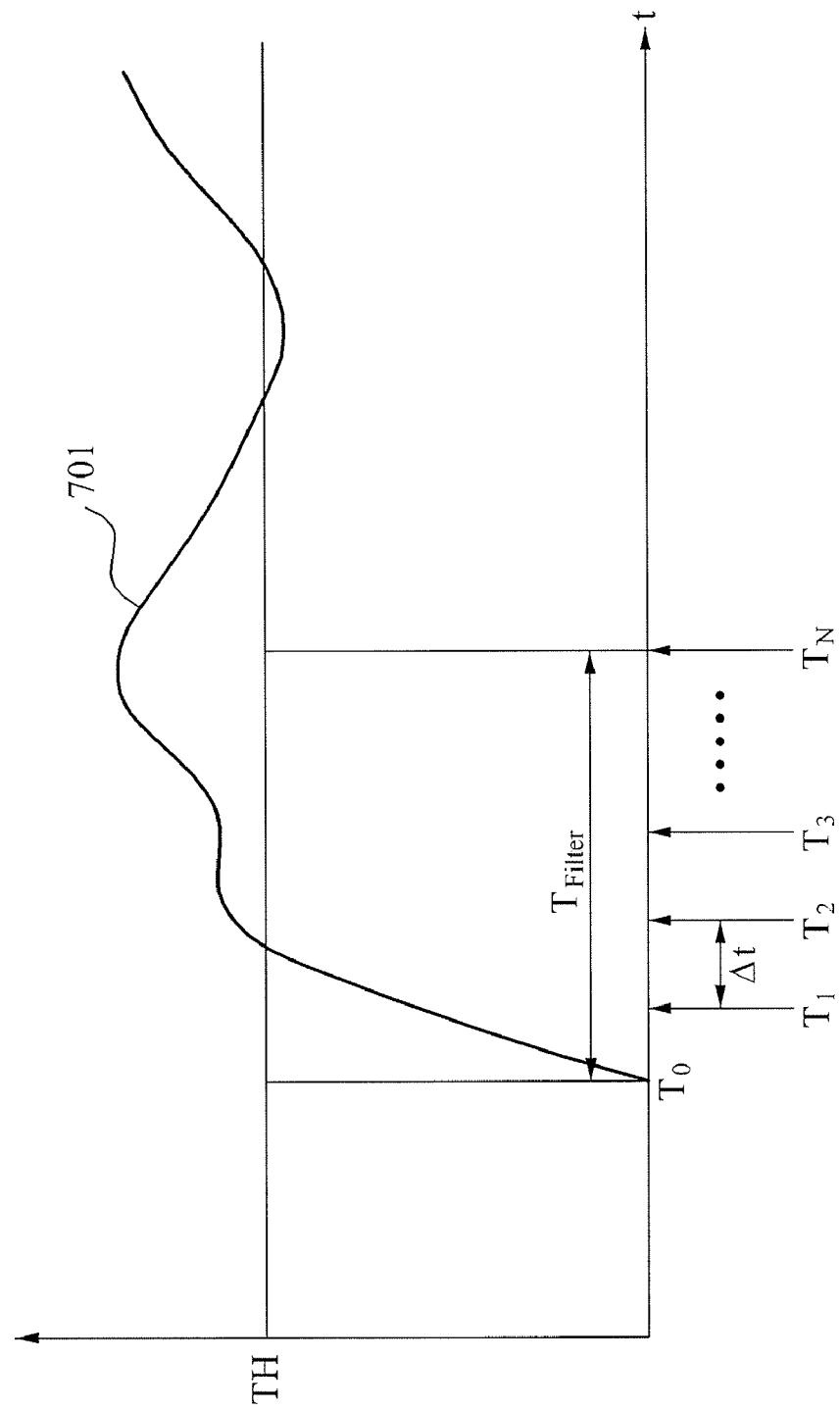
FIG. 7 is a graph illustrating an example of motion sensor filtering according to an embodiment of the present invention.

As shown in FIG. 7, the filtering processor 403 may filter the motion sensing information and determine whether an actual motion occurs.

In FIG. 7, $T_0$ denotes a time when motion sensing information 701 starts being received, $T_{Filter}$ denotes a time to filter the motion sensing information 701, $\Delta t$ denotes a time interval to check the motion sensing information 701, and TH denotes a threshold value to determine whether the real motion occurs based on the motion sensing information 701.

In this instance, when the motion sensing information 701 occurs to be greater than or equal to the threshold value TH during the time interval $\Delta t$, the filtering processor 403 may determine the real motion has occurred.

The motion sensing information may be filtered according to types of an asset and an environment of the asset. The filtering parameter may be changed according to a setting or automatically, and may be provided from the filtering parameter processor 313.

When the filtered motion sensing information is less than a reference value, the LU manager 405 may not perform a LU. Conversely, when the filtered motion sensing information is greater than or equal to the reference value, the LU manager 405 may perform the LU.

The LU manager 405 may request an upper node, that is, a gateway or an application server, to perform the LU of the asset by collecting the location information and by transmitting the collected location information to the upper node.

Figure 5:
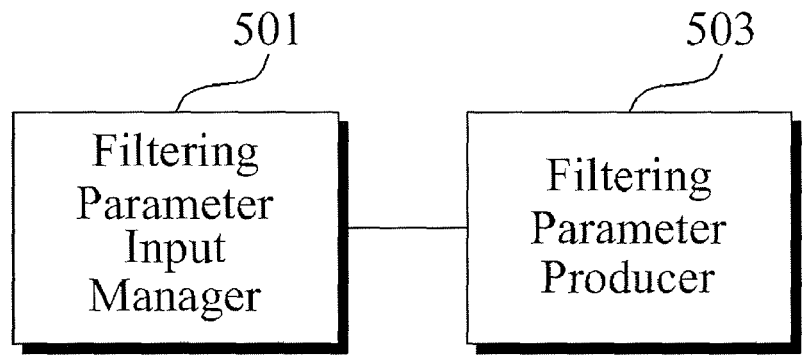
FIG. 5 is a block diagram illustrating a configuration of a filtering parameter processor according to an embodiment of the present invention.

FIG. 5 is a block diagram illustrating a configuration of a filtering parameter processor 500 according to an embodiment of the present invention.

The filtering parameter processor 500 of FIG. 5 may be applicable to the filtering parameter processor 313 of FIG. 3.

Referring to FIG. 5, the filtering parameter processor 500 may include a filtering parameter input manager 501 and a filtering parameter producer 503.

The filtering parameter input manager 501 may provide, to the MDDPM processor 311 of FIG. 3, a filtering parameter that is generated via the filtering parameter producer 503.

The filtering parameter producer 503 may generate the filtering parameter based on an asset property, such as accuracy of location information, a battery lifetime, a fast asset with a fast movement speed, a slow asset with a slow movement speed, and the like.

Here, generating of the filtering parameter may include concepts of setting and changing the filtering parameter.

Also, the filtering parameter producer 503 may generate the filtering parameter according to an asset environment such as a zone area where an asset tracking apparatus belongs, a neighboring environment that is monitored by the asset tracking apparatus, and the like.

Also, the filtering parameter producer 503 may generate the filtering parameter according to a property of a sensor, included in the asset tracking apparatus, or a user input.

Hereinafter, an example of generating the filtering parameter will be described.

Here, it may be assumed that the entire energy consumed at the asset tracking apparatus for a predetermined period of time is a sum of energy consumed for polling, energy consumed for sleep, energy consumed for performing a LU, and energy consumed for filtering motion sensing information.

The largest energy may be consumed for performing the LU and filtering the motion sensing information.

The filtering parameter processor 500 may predict the battery lifetime by calculating an interrupt value and time of the sensor that is received by the asset tracking apparatus for a predetermined period of time.

Also, the filtering parameter may be generated based on the predicted battery lifetime.

As described above, the filtering parameter processor 500 may generate different location accuracy and battery lifetime according to the asset type.

The following Table 1 shows examples of filtering parameters that are set to be different according to the asset type.

TABLE 1

| Assets | $T_{Filter}$ | $T_{interval} = T_{S+1} - T_S$ | TH | Success Rate |
|---|---|---|---|---|
| Fast Assets | 5 sec | 0.5 sec | 10 | over 75% |
| Slow Assets | 1 min. | 5 sec | 3 | over 75% |

Figure 6:
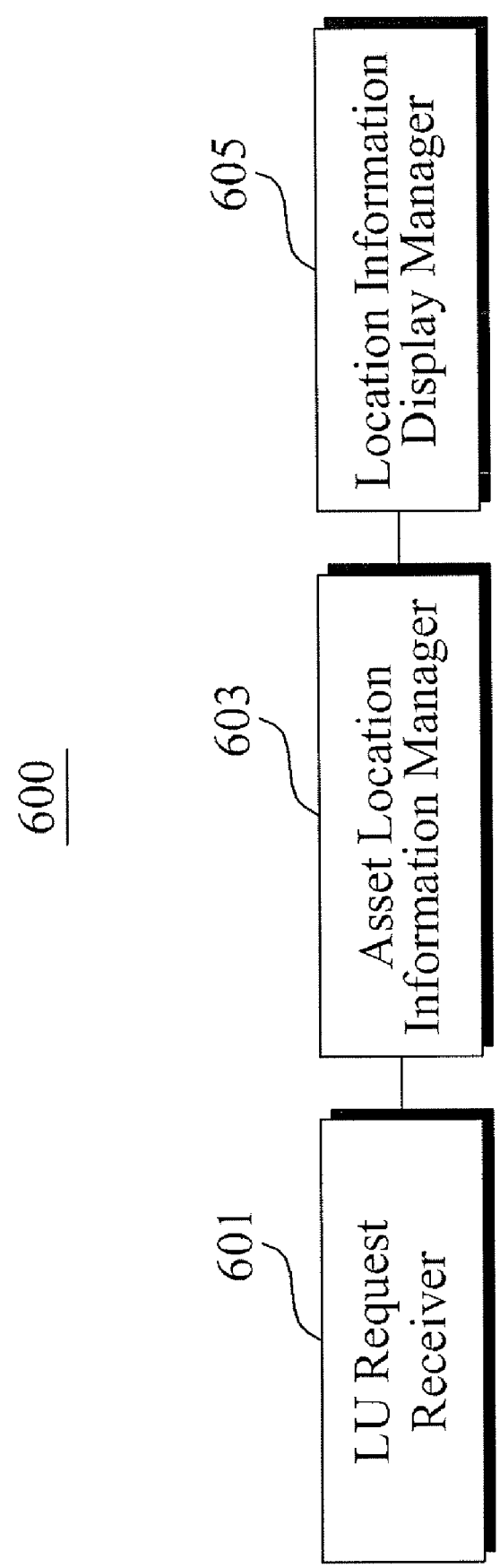
FIG. 6 is a block diagram illustrating a configuration of an asset tracking apparatus according to still another embodiment of the present invention.

FIG. 6 is a block diagram illustrating a configuration of an asset tracking apparatus 600 according to still another embodiment of the present invention.

The asset tracking apparatus 600 of FIG. 6 may be applicable to the application server 107 of FIG. 1.

Referring to FIG. 6, the asset tracking apparatus 600 may include a LU request receiver 601, an asset location information manager 603, and a location information display manager 605.

The LU request receiver 601 may receive a LU request from an asset node that performs a LU based on a motion sensing.

Here, the asset node may have the configuration of FIG. 2 or 3.

Accordingly, the asset node may sense motion information, and determine whether the motion information requires the LU, based on a filtering parameter.

The asset location information manager 603 may update location information of the asset node that transmits the LU request, based on the LU request, and may store and mange the updated location information of the asset node.

The location information display manager 605 may display the location information of the asset node via a display device.

The display device may be, for example, a PDA, a PC, a mobile phone, a display board, a TV, and the like.

Figure 8:
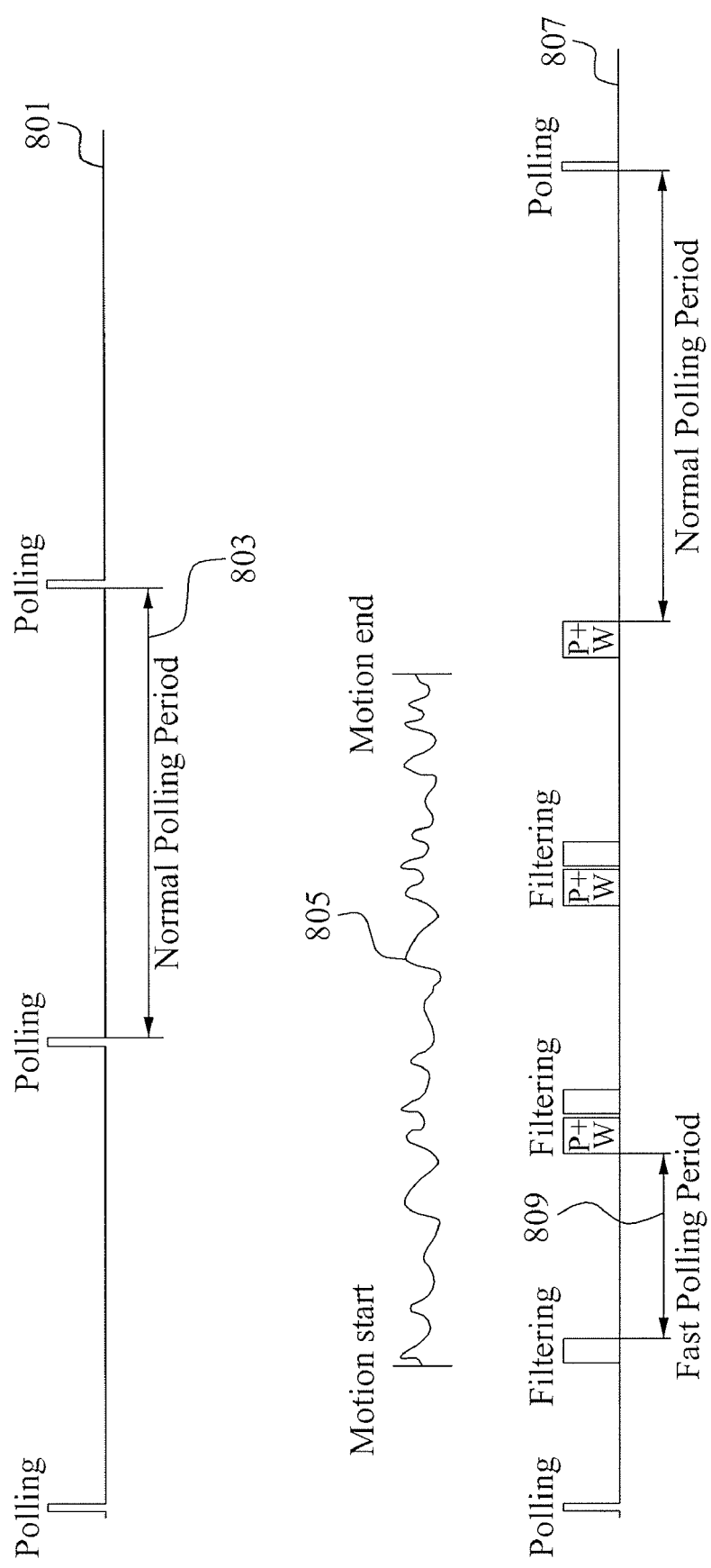
FIG. 8 illustrates an operation state of an asset tracking apparatus according to an embodiment of the present invention.

FIG. 8 illustrates an operation state of an asset tracking apparatus according to an embodiment of the present invention.

Here, the asset tracking apparatus may have a configuration of FIG. 2 or 3.

Referring to FIG. 8, the operation state of the asset tracking apparatus in a case 801 where motion sensing information does not exist is different from the operating state of the asset tracking apparatus in a case 807 where the motion sensing information exists.

Initially, in the case 801, the asset tracking apparatus may simply transmit and receive a polling message with a neighboring node according to a normal polling period 803.

The normal polling period 803 and the polling message may be the most basic operations for processing a query that occurs in a PAN.

When motion sensing information occurs as indicated by a wave 805, the asset tracking apparatus may set a polling interval for exchange of the polling message to be short as a fast polling period 809, and perform the LU depending on whether a real motion occurs.

As shown in FIG. 8, for the normal polling period 803 and the fast polling period 809, the asset tracking apparatus may be in a sleep mode. Specifically, the asset tracking apparatus may consume a significantly small amount of battery for the normal polling period 803 and the fast polling period 809.

Accordingly, compared with when periodically performing the LU for the asset, when performing the LU based on the motion sensing, it is possible to enhance the battery lifetime according to a motion frequency.

Figure 9:
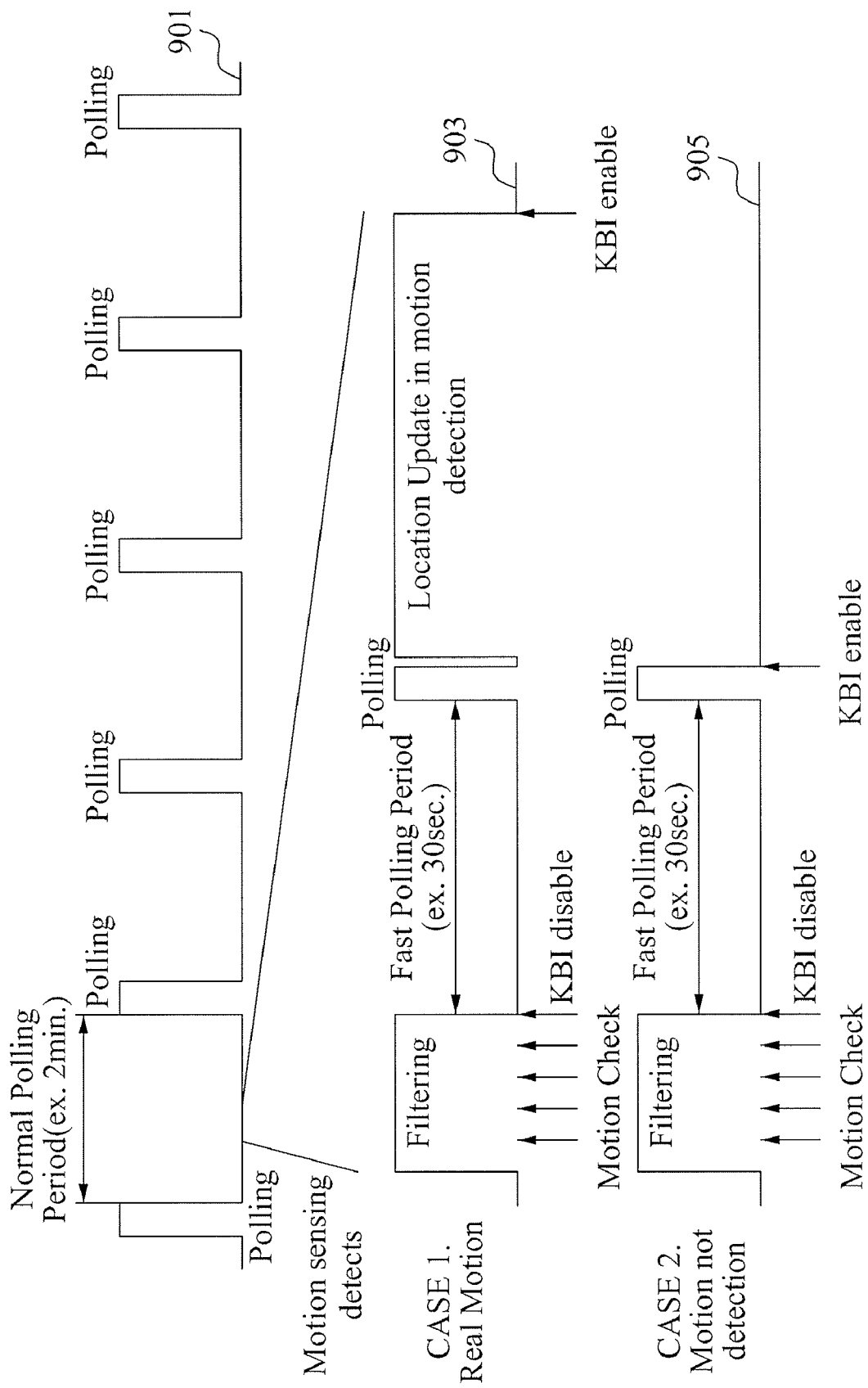
FIG. 9 illustrates an operation example of an asset tracking apparatus according to an embodiment of the present invention.

FIG. 9 illustrates an operation example of an asset tracking apparatus according to an embodiment of the present invention.

In FIG. 9, a normal polling period 901 of the asset tracking apparatus is set to 2 minutes.

In FIG. 9, a CASE (1) 903 corresponds to a case where a real motion occurs. Here, a polling interval is set to be short, for example, 30 seconds, as a fast polling period. Also, a LU of an asset is performed.

As described above, when the real motion occurs, the motion sensing information is greater than or equal to a reference value.

In FIG. 9, a CASE (2) 905 corresponds to a case where the real motion is not detected. Here, the polling interval is set to be short, but the LU of the asset is not performed. The polling interval is set again to be a normal polling period.

As described above, when the real motion is not detected, the motion sensing information is less than the reference value.

FIGS. 10 through 15 illustrate examples of LU and motion sensor filtering under various conditions according to an embodiment of the present invention.

Here, motion sensor filtering indicates filtering of motion sensing information according to a filtering parameter.

Figure 10:
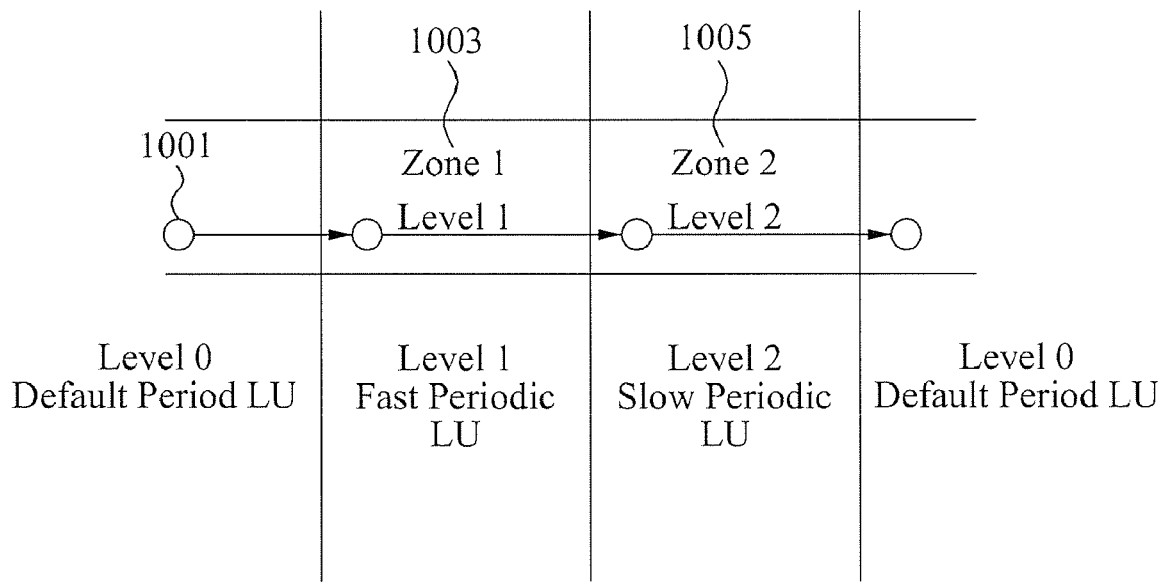

FIG. 10 illustrates an example of dynamic periodic LU according to a zone area where an asset node 1001 belongs.

Referring to FIG. 10, when the asset node 1001 belongs to a zone (1) 1003, the asset node 1001 may perform a fast periodic LU of level 1. When the asset node 1001 belongs to a zone (2) 1005, the asset node 1001 may perform a low periodic LU of level 2.

Figure 11:
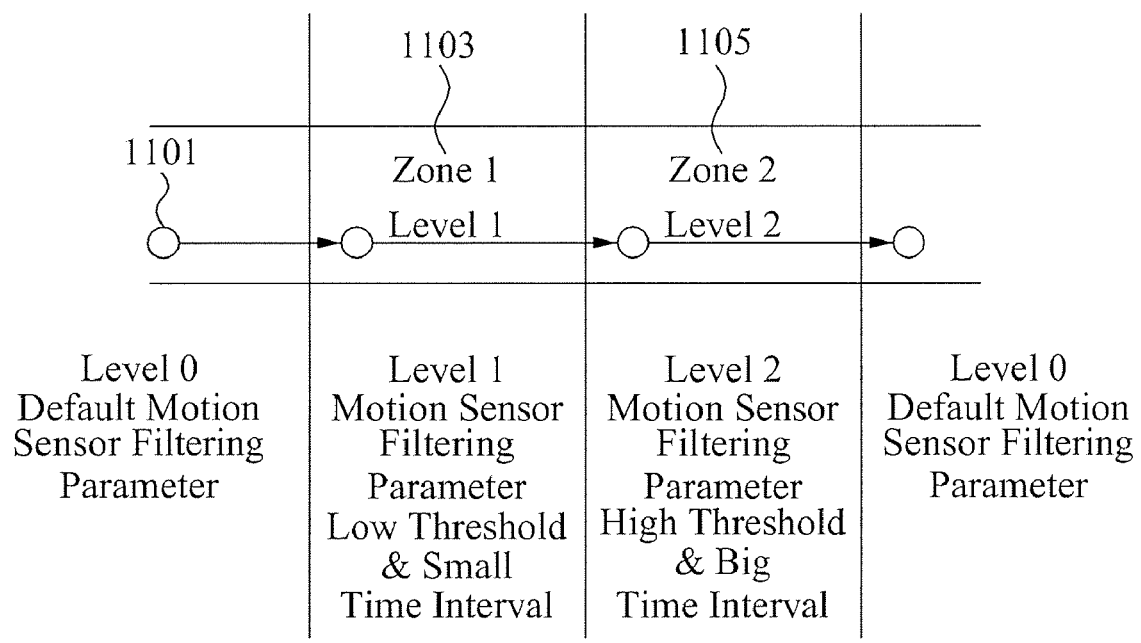

FIG. 11 illustrates an example of dynamic motion sensor filtering according to a zone area where an asset node 1101 belongs.

Referring to FIG. 11, when the asset node 1101 belongs to a zone (1) 1103, the asset node 1101 may perform a motion sensor filtering of level 1. When the asset node 1101 belongs to a zone (2) 1105, the asset node 1101 may perform a motion sensor filtering of level 2.

Figure 12:
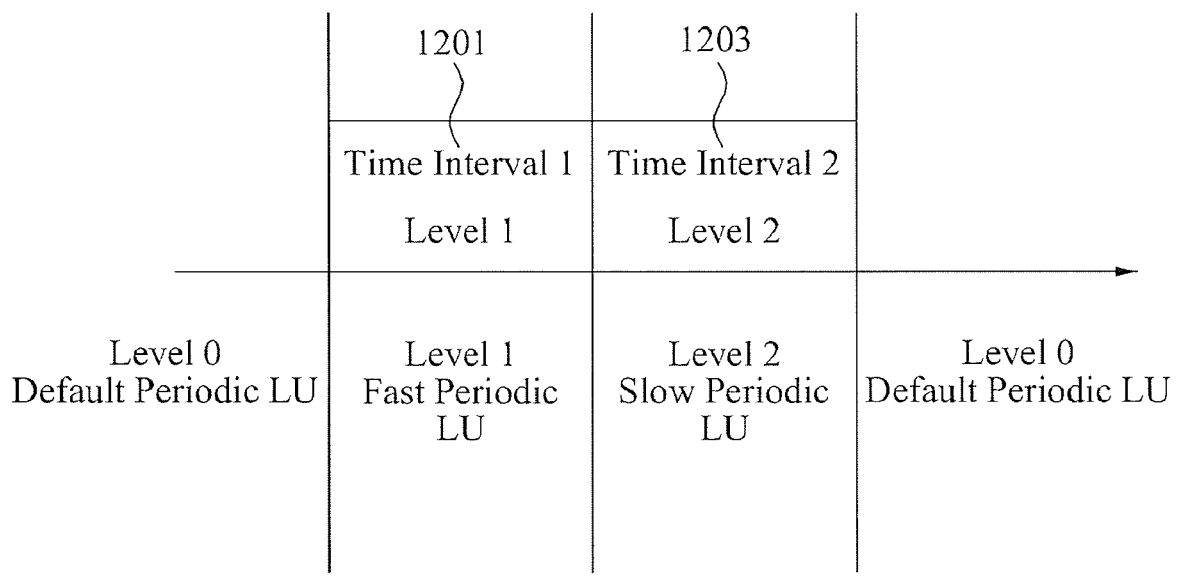

FIG. 12 illustrates an example of a dynamic periodic LU according to a time division.

Referring to FIG. 12, a LU may be performed at a fast period of level 1 in a time interval (1) 1201, and may also be performed at a slow period of level 2 in a time interval (2) 1203.

Figure 13:
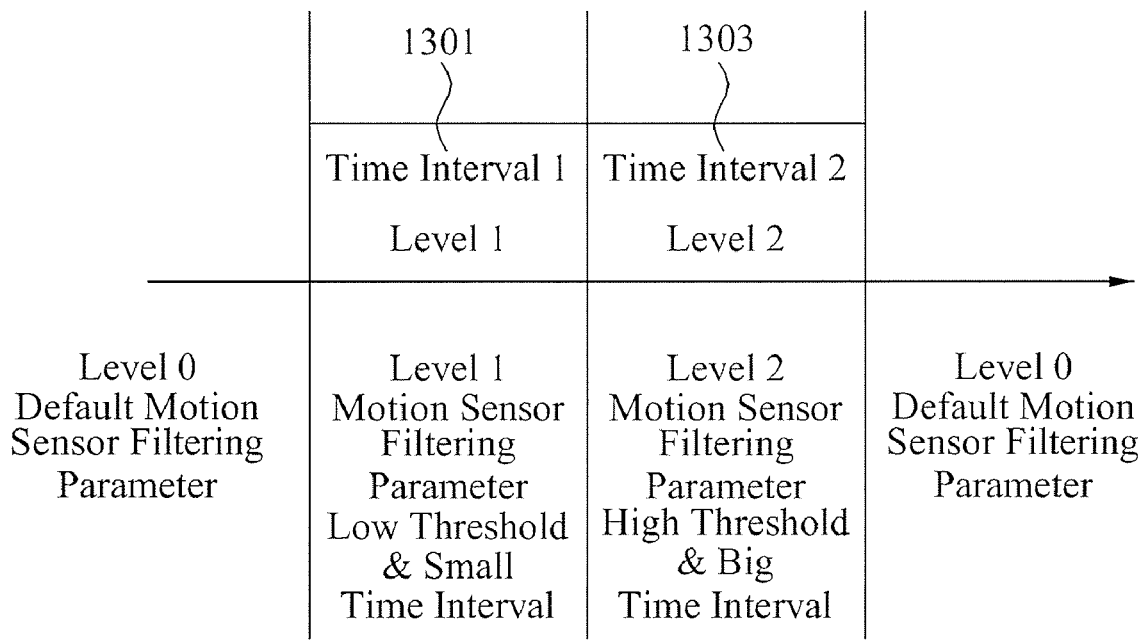

FIG. 13 illustrates an example of a dynamic motion sensor filtering according to a time division.

Referring to FIG. 13, a motion sensor filtering may be performed at level 1 in a time interval (1) 1301, and may also be performed at level 2 in a time interval (2) 1303.

FIG. 14 illustrates an example of a dynamic periodic LU according to a sensor condition.

Here, the sensor condition may include a temperature, a humidity, and the like.

Referring to FIG. 14, a LU may be performed at a fast period of level 1 in a sensor condition (1) 1401, and may also be performed at a slow period of level 2 in a sensor condition (2) 1403.

FIG. 15 illustrates an example of a dynamic motion sensor filtering according to a sensor condition.

Referring to FIG. 15, a motion sensor filtering may be performed at level 1 in a sensor condition (1) 1501, and may also be performed at level 2 in a sensor condition (2) 1503.

Figure 16:
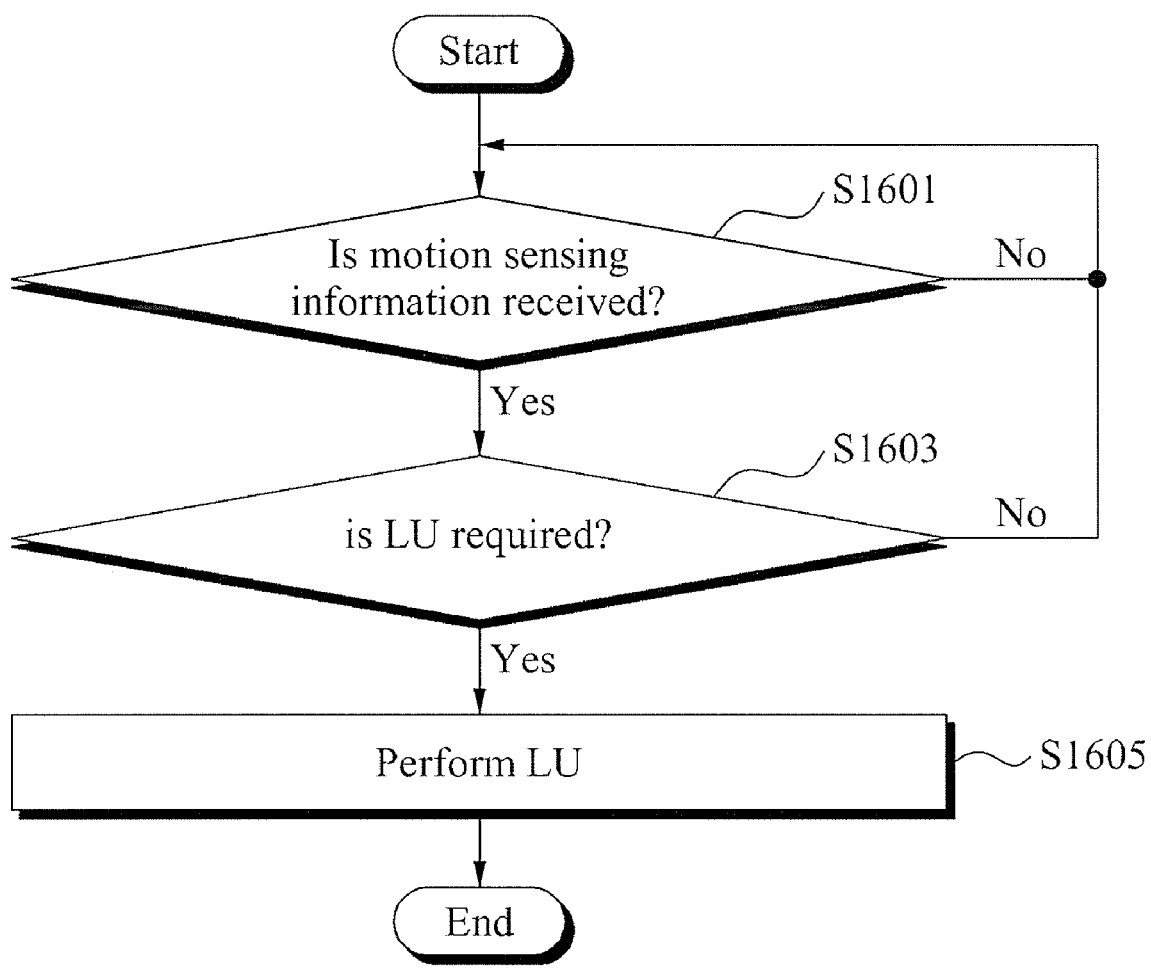
FIG. 16 is a flowchart illustrating an asset tracking method according to an embodiment of the present invention.

FIG. 16 is a flowchart illustrating an asset tracking method according to an embodiment of the present invention.

The asset tracking method may be performed by an asset node constructed as shown in FIG. 2 or 3.

In operation S1601, the asset node may determine whether motion sensing information is received. The motion sensing information may be detected via, for example, a motion accelerator sensor or a motion sensor.

When the motion sensing information is received, the asset node may determine whether a LU of the asset node is required, based on the motion sensing information and a filtering parameter, in operation S1603.

As described above, the filtering parameter may include at least one of a motion filtering time, a time interval to check the motion sensing information, and a threshold value.

Also, the filtering parameter may be determined based on at least one of accuracy of location information, a battery lifetime, a zone area where the asset node belongs, and a sensor condition that is sensed by the asset node.

When it is determined the LU is required, the asset node may perform the LU of the asset node.

Figure 17:
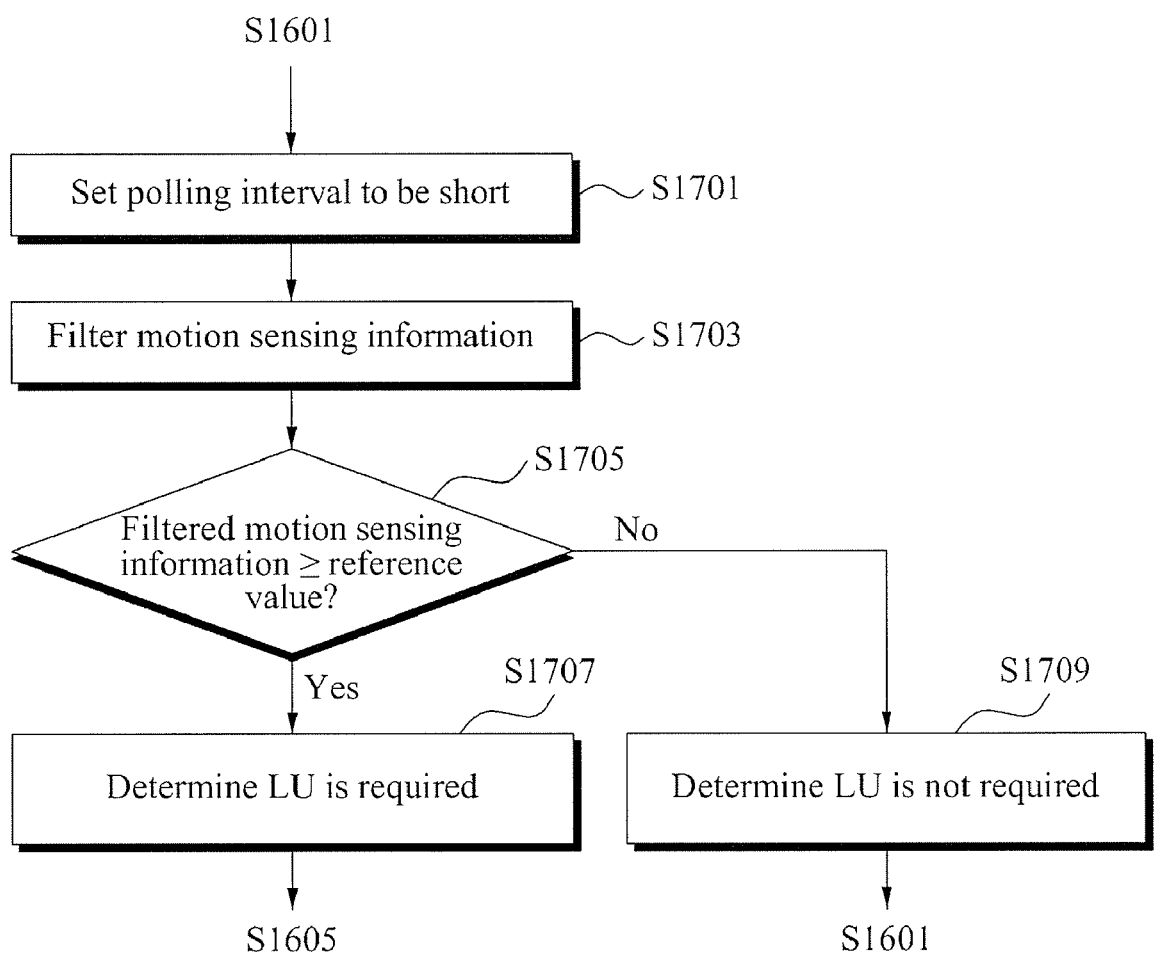
FIG. 17 is a flowchart illustrating an operation of determining whether an LU is required shown in FIG. 16.

FIG. 17 is a flowchart illustrating operation S1603 FIG. 16.

Referring to FIG. 17, when the motion sensing information is received, the asset node may set a polling interval for exchange of a polling message to be short, for example, to be shorter than a normal polling period in operation S1701.

Here, the aforementioned example of FIG. 9 may be applicable to an example of setting the poling interval to be short.

In operation S1703, the asset node may filter the motion sensing information based on the filtering parameter.

In operation S1705, the asset node may compare the filtered motion sensing information with a reference value to determine whether a LU is required.

Here, the reference value may be a threshold value among filtering parameters.

When the filtered motion sensing information is less than the reference value, the asset node may determine the LU is not required in operation S1709. Conversely, when the filtered motion sensing information is greater than or equal to the reference value, the asset node may determine the LU is required in operation S1707.

The above-described exemplary embodiments of the present invention may be recorded in computer-readable media including program instructions to implement various operations embodied by a computer. The media may also include, alone or in combination with the program instructions, data files, data structures, and the like. Examples of the program instructions may be specially designed for the invention, or may be kwon and available to those in the art.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for asset tracking based on a ubiquitous sensor network using a motion sensing, the apparatus comprising:
    a motion sensing manager to receive motion sensing information from a sensor;
    a filtering processor to filter the motion sensing information based on a filtering parameter and to determine whether a motion occurs based on the filtered motion sensing information; and
    a location information update manager to perform a location information update depending on whether the motion occurs as determined by the filtering processor.

2. The apparatus of claim 1, wherein the filtering parameter comprises at least one of a motion filtering time, a time interval to check the motion sensing information, and a threshold value.

3. The apparatus of claim 1, wherein the location information update manager does not perform the location information update when the filtered motion sensing information is less than a reference value, and performs the location information update when the filtered motion sensing information is greater than or equal to the reference value.

4. The apparatus of claim 1, wherein the location information update manager sets a polling interval for exchange of a polling message to be short when the motion sensing information is received, and performs the location information update depending on whether the motion occurs.

5. The apparatus of claim 1, further comprising:
    a filtering parameter processor to generate the filtering parameter according to a predetermined scheme and to provide the filtering processor with the generated filtering parameter.

6. The apparatus of claim 5, wherein the filtering parameter processor generates the filtering parameter based on accuracy of location information, a battery lifetime, a zone area where the asset tracking apparatus belongs, and a sensor condition sensed by the asset tracking apparatus.

7. An apparatus for asset tracking based on a ubiquitous sensor network using motion information, the apparatus comprising:
    a location information update request receiver to receive a location information update request from an asset node that performs a location information update based on motion information received by the asset node; and
    an asset location information manager to update location information of the asset node based on the location information update request and to mange the location information of the asset node,
    wherein the asset node determines whether the motion information requires the location information update, based on a filtering parameter.

8. The apparatus of claim 7, further comprising:
    a location information display manager to display the updated location information of the asset node via a display device.

9. A method for asset tracking based on a ubiquitous sensor network using motion sensing information, the method comprising:
    determining whether motion sensing information is received;
    determining whether a location information update of an asset node is required based on the motion sensing information and a filtering parameter, when the motion sensing information is received; and performing the location information update of the asset node when it is determined the location information update of the asset node is required.

10. The method of claim 9, wherein the determining whether the location information update is required comprises:
    setting a polling interval for exchange of a polling message to be short when the motion sensing information is received;
    filtering the motion sensing information based on the filtering parameter; and
    comparing the filtered motion sensing information with a reference value to determine whether the location information update is required.

11. The method of claim 10, further comprising:
    determining the location information update is not required when the filtered motion sensing information is less than the reference value, and determining the location information update is required when the filtered motion information is greater than or equal to the reference value.

12. The method of claim 9, wherein the filtering parameter comprises at least one of a motion filtering time, a time interval to check the motion sensing information, and a threshold value.

13. The method of claim 9, wherein the filtering parameter is determined based on accuracy of location information, a battery lifetime, a zone area where the asset node belongs, and a sensor condition sensed by the asset node.

14. A method for asset tracking based on a ubiquitous sensor network using motion information, the method comprising:
    receiving a location information update request from an asset node that performs a location information update based on motion information received by the asset node; and
    updating location information of the asset node based on the location information update request to manage the location information of the asset node,
    wherein the location information update request is received when the motion information received by the asset node is greater than or equal to a reference value determined based on a filtering parameter.

15. The method of claim 14, further comprising:
    displaying the updated location information of the asset node via a display device.

* * * * *

UNITED STATES PATENT AND TRADEMARK OFFICE
CERTIFICATE OF CORRECTION

| | | |
|---|---|---|
| PATENT NO. | : 8,102,271 B2 | Page 1 of 1 |
| APPLICATION NO. | : 12/368568 | |
| DATED | : January 24, 2012 | |
| INVENTOR(S) | : Heo et al. | |

It is certified that error appears in the above-identified patent and that said Letters Patent is hereby corrected as shown below:

In Column 10, Line 52, in Claim 7, delete "mange" and insert -- manage --, therefor.

Signed and Sealed this
Twenty-fifth Day of December, 2012

David J. Kappos
*Director of the United States Patent and Trademark Office*